US012746582B2

(12) United States Patent
Osiniak et al.

(10) Patent No.: US 12,746,582 B2
(45) Date of Patent: Sep. 29, 2026

(54) VACUUM CLEANER AND METHOD FOR OPERATING A VACUUM CLEANER

(71) Applicant: BSH Hausgeräte GmbH, Munich (DE)

(72) Inventors: Mateusz Osiniak, Sokolow Malopolski (PL); Andrzej Oblaski, Rzeszow (PL)

(73) Assignee: BSH Hausgeräte GmbH, Munich (DE)

( * ) Notice: Subject to any disclaimer, the term of this patent is extended or adjusted under 35 U.S.C. 154(b) by 113 days.

(21) Appl. No.: 18/529,049

(22) Filed: Dec. 5, 2023

(65) Prior Publication Data

US 2024/0198397 A1 Jun. 20, 2024

(30) Foreign Application Priority Data

Dec. 15, 2022 (EP) .................................... 22213884

(51) Int. Cl.

*B08B 9/035* (2006.01)
*A47L 9/00* (2006.01)
*A47L 9/06* (2006.01)
*A47L 9/24* (2006.01)
*A47L 9/28* (2006.01)

(52) U.S. Cl.

CPC ............ *B08B 9/035* (2013.01); *A47L 9/0072* (2013.01); *A47L 9/066* (2013.01); *A47L 9/248* (2013.01); *A47L 9/2842* (2013.01); *A47L 9/2857* (2013.01); *B08B 2209/032* (2013.01)

(58) Field of Classification Search

CPC .......... A47L 9/0072; A47L 9/02; A47L 9/066; A47L 9/248; A47L 9/2805; A47L 9/2842; A47L 9/2857; B08B 2209/032; B08B 9/035

See application file for complete search history.

(56) References Cited

U.S. PATENT DOCUMENTS

2004/0221415 A1* 11/2004 Tondra .................. A47L 9/2805 15/319
2013/0008468 A1* 1/2013 Bertram .................... A47L 9/16 15/353
2015/0000069 A1* 1/2015 Conrad ..................... A47L 9/16 15/329
2019/0075989 A1* 3/2019 Krebs ................... A47L 9/2857

FOREIGN PATENT DOCUMENTS

DE 102010036772 A1 2/2012
EP 2113184 A2 11/2009
GB 2161902 A 1/1986

* cited by examiner

*Primary Examiner* — Douglas Lee
(74) *Attorney, Agent, or Firm* — Laurence A. Greenberg; Werner H. Stemer; Ralph E. Locher

(57) ABSTRACT

A vacuum cleaner includes a body, an electrically-driven suction unit, a device for collecting dust, a suction channel, a nozzle communicating with the body through the suction channel, an intake device for ensuring an additional portion of air fed into the suction channel and being adjustable between an opened and a closed state, and a control unit for controlling the suction unit. The intake device is bi-directionally electrically connected to the control unit, so that transmission of data or signals between the intake device and the control unit is enabled. The control unit is configured to generate a signal for controlling the intake device in the event of detecting the cleaning start signal or the cleaning end signal. A method for operating a vacuum cleaner is also provided.

7 Claims, 2 Drawing Sheets

VACUUM CLEANER AND METHOD FOR OPERATING A VACUUM CLEANER

CROSS-REFERENCE TO RELATED APPLICATION

This application claims the priority, under 35 U.S.C. § 119, of European Patent Application EP22213884, filed Dec. 15, 2022; the prior application is herewith incorporated by reference in its entirety.

FIELD AND BACKGROUND OF THE INVENTION

The invention relates to an electric motor driven suction cleaning apparatus, more particularly to an electric vacuum cleaner including a suction nozzle or brush, a suction channel and a device for collecting dust. The invention also relates to a method for operating a vacuum cleaner.

A vacuum cleaner is an electric appliance that filters dust, dirt and foreign matter together with air into a body provided therein, after suctioning them by using a vacuum motor mounted in the body.

Generally, vacuum cleaners may be classified at least into a canister-type having a suction nozzle or brush communicating with the body through a suction pipe or pipes and a flexible suction hose, wherein the body is equipped with wheels for moving the vacuum cleaner over the floor. Another type of vacuum cleaners is a stick-type vacuum cleaner having a suction nozzle that can be directly connected to the body or through a suction pipe or pipes, wherein the body is held in the user's hand during operation.

Both types of vacuum cleaners may include a vacuum cleaner body having a vacuum motor configured to generate a suction force mounted therein, a suction nozzle configured to suck dust and other rubbish scattered on a surface by the suction force generated in the body, and a connection pipe configured to connect the body and the suction nozzle with each other.

The suction force enables the suction nozzle to suction therein the air containing dust and other rubbish scattered on the surface which will be cleaned.

The air containing the dust and other rubbish may be drawn into the body through the connection pipe from the nozzle. The dust and other rubbish contained in the air sucked into the body may be separated within a dust separation device provided in the body, as a cyclonic separation apparatus or other device.

After that, the separated dust and other rubbish may be collected in a device for collecting dust that is in communication with the dust separation device and the air having the dust and foreign matters separated therefrom may be exhausted outside the body.

Customers use vacuum cleaners on many different surfaces and carpets. For some of them, cleaning parameters, e.g. suction power, is reduced due to smaller airflow on some dense carpet. That causes the dust and the other rubbish particles to not be suctioned directly to the device for collecting dust, but instead they levitate in the suction channel. That results in a poor cleaning effect, because when customers switch off the vacuum cleaner during an apparent levitation phenomena, the particles have not been vacuumed, but instead fall down again on the cleaned surface.

UK Patent Application GB 2 161 902 A discloses a non-return flap valve for a vacuum cleaner, including a movable sealing flap, a stationary part having a device for mounting the non-return flap valve in a nozzle body of the vacuum cleaner, a strip connecting the flap to the stationary part and spacing the flap from the stationary part, and a constriction thickness across the strip. The constriction defines and extends along a flexing axis about which the flap articulates relative to the stationary part to prevent the dust and debris accumulated in a collecting chamber from escaping when the appliance is switched off, but unfortunately it does not prevent particles that are not accumulated in the chamber from falling out of the suction channel.

German Patent Application EP 2 113 184 A2 discloses a vacuum cleaner having a suction port and a suction channel, where a capacitive humidity sensor is disposed in the suction channel. The suction channel opens during detection of humidity in a secondary air opening that is spatially attached to the humidity sensor. Monitoring and/or cleaning agents in contact with the humidity sensor proceed during opening movement of the air opening. The air opening is obtained by opening a part of a suction channel wall to prevent water from being drawn into the vacuum cleaner. A locking position of the air opening is secured by magnets. The above-mentioned solution does not prevent particles from falling out of the suction channel, when the vacuuming is finished.

SUMMARY OF THE INVENTION

It is accordingly an object of the invention to provide a vacuum cleaner and a method for operating a vacuum cleaner, which overcome the hereinafore-mentioned disadvantages of the heretofore-known devices and methods of this general type and which collect all residual dust and other rubbish in a suction channel at a device for collecting dust of a body when the vacuuming is finished, in order to improve cleaning comfort and performance.

With the foregoing and other objects in view there is provided, in accordance with the invention, a vacuum cleaner for cleaning a surface, comprising a body, an electrically-driven suction unit, a device for collecting dust, a suction channel, a nozzle fluidically communicating with the body through the suction channel, an intake device fluidically communicating with the suction unit, provided for ensuring an additional portion of air into the suction channel, and able to be adjusted between an opened state and a closed state, to open and close a by-pass channel, a control unit configured to control the suction unit, having a processor for storing, calculating and interpreting signals or data and being operated by a user, and a starting and stopping device electrically communicating with the control unit and configured to generate a cleaning start signal or a cleaning end signal. The intake device is bi-directionally electrically connected to the control unit, so that a transmission of data or signals between the intake device and the control unit is enabled, and the control unit is configured to generate a signal for controlling the intake device in the event of detecting the cleaning start signal or the cleaning end signal.

Advantageously, the vacuum cleaner is equipped with the intake device that is provided for ensuring an additional portion of air into the suction channel and also for reducing air flow resistance by way of a reduction of air suction resistance after the vacuum cleaner is switched off, i.e. when the user decides to finish cleaning the surface, which is expressed by changing the state of the on/off switch. Then the additional portion of air can be sucked into the suction channel, and thus dust particles, which resided in the suction channel, can be removed from the suction channel to the dust collecting device, thanks to which they do not fall out on the cleaned surface, which significantly improves the comfort and efficiency of cleaning.

In a preferred embodiment of the invention the intake device is configured to generate data, that provide the control unit with information about the state of the intake device, wherein these data are used to control the suction unit by using the control unit. The positive effect is that the control unit can adapt the control signals to the current state of the intake device.

Preferably, the intake device has an actuator, that is controlled by the control unit, wherein the actuator is configured to change the state of the intake device on the basis of the signal, therefore the state of the intake device can be changed automatically without user intervention.

In another preferred embodiment of the invention the starting and stopping device is an electrical switch, wherein the switch communicates with the control unit via a wired transmission. Such a solution is inexpensive to use and reliable to operate.

Advantageously, the intake device is configured to generate and send to the control unit the cleaning end signal for controlling the suction unit, when the intake device has been manually adjusted from the closed to the opened state by the user, then the suction unit is switched off immediately or after a calculated and counted predetermined time by the control unit. The positive effect is that the user can choose how to start cleaning the suction channel by changing the state of the switch or by changing the state of the intake device, namely by changing it state from a closed to an opened state.

In a preferred embodiment of the invention the intake device includes at least one paddle, that is disposed on a bottom of the nozzle, and the actuator is configured to rotate the paddle between horizontal and vertical positions and back again in relation to the bottom of the nozzle in order to increase a gap between the bottom of the nozzle and the cleaned surface, when the intake device is in the opened state. Therefore, at least a portion of the nozzle is lifted above the cleaned surface and therefore more air can be sucked into the inlet to remove residual dust particles from the suction channel by using the increased gap.

In another preferred embodiment, a vacuum cleaner also has a suction pipe that forms at least a portion of the suction channel, and the intake device includes a sleeve which slides on the outer surface of the suction pipe, and an opening disposed in the suction pipe. The sleeve is configured to air-tightly close or open the opening when sliding along the suction pipe. Preferably, the sleeve is provided with a handle which projects transversely from an outer surface of the sleeve for the movement of the sleeve. The positive effect is that the inlet device can be operated by the user both by hand or by foot, and the solution itself is uncomplicated, reliable and easy to use in production.

Preferably, the intake device includes a solenoid valve configured to be operated by the control unit, wherein the solenoid valve is disposed in the nozzle and is fluidically connected with the suction channel and is configured to allow inlet air to bypass a nozzle inlet.

With the objects of the invention in view, there is also provided a method for operating the vacuum cleaner, more particularly a method for cleaning the suction channel according to the present invention, which comprises performing the method just after the user finishes cleaning the surface. During the cleaning of the surface the intake device is in the closed state, so the suction channel is provided with air merely through the inlet of the nozzle. The method of cleaning the suction channel is started when a state of the starting and stopping device is changed from the on to off position and the cleaning end signal is sent to the control unit, then the suction unit is switched off by the control unit, immediately or alternatively it is switched off after a calculated and counted time period has elapsed. The control unit generates the signal and sends it to the intake device. Based on the signal, the intake device changes the state from the closed state to the opened state. After the predetermined time, that is calculated by the processor, the control unit switches off the suction unit. The user is informed about the end of the cleaning process. Then, the intake device is changed to the closed state manually by the user or automatically by the control unit which generates and sends a signal to the intake device that is configured to be actuated.

With the objects of the invention in view, there is concomitantly provided a method for operating the vacuum cleaner in order to clean the suction channel, which comprises performing the method for cleaning the suction channel just after the user finishes cleaning the surface. During the cleaning of the surface, the intake device is in the closed state. The method of cleaning the suction channel is started when the user manually changes the state of the intake device from the closed to the opened state, then the intake device generates and sends the cleaning end signal to the control unit, to start counting a time period for switching off the suction unit, or alternatively the suction unit is switched off immediately when the intake device changes the state. After the counted time, that is calculated by the processor has elapsed, the control unit switches off the suction unit. The user is informed about the end of the cleaning process. Then, the intake device is changed to the closed state manually by the user or automatically by the control unit, which generates and sends a signal to the intake device that is configured to be actuated.

Other features which are considered as characteristic for the invention are set forth in the appended claims.

Although the invention is illustrated and described herein as embodied in a vacuum cleaner and a method for operating a vacuum cleaner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
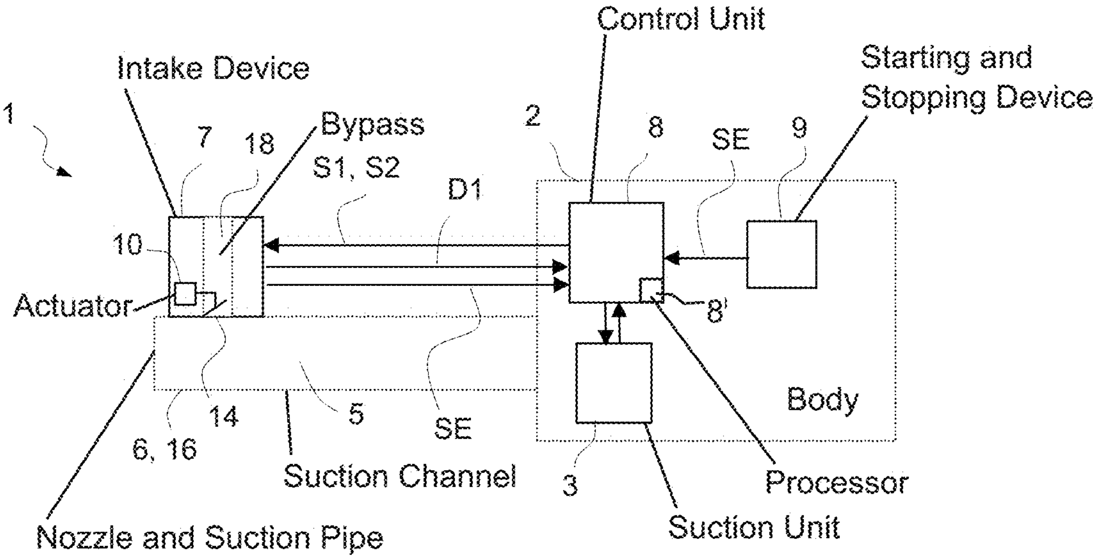
FIG. 1 is a schematic and block diagram of a vacuum cleaner according to the present invention.

In cooperation with the attached drawing, the technical contents and detailed description of the present invention are described hereinafter according to a preferable embodiment, which is not used to limit its executing scope. Any equivalent variation and modification made according to the appended claims is covered by the claims which are claimed by the instant application. In the following description of the preferred embodiments of the present invention, similar identical reference numbers designate identical comparable components.

Reference will now be made to the drawing figures to describe the present invention in detail.

Referring now to the figures of the drawings in detail and first, particularly, to FIG. 1 thereof, there is seen a schematic and block diagram of a vacuum cleaner 1 according to the present invention. The vacuum cleaner 1, which is intended for cleaning a surface 13, has a body 2, an electrically-driven suction unit 3, a device 4 for collecting dust, a suction channel 5, a nozzle 6 that fluidically communicates with the body 2 through the suction channel 5, and an intake device 7 with a by-pass 18 fluidically communicating with the suction unit 3 through the suction channel 5. The intake device 7 is provided for ensuring that an additional portion of the air is fed into the suction channel 5, and can be adjusted between an opened state and a closed state, to open and close the by-pass channel 18. When the intake device 7 is in the opened state, the additional portion of air is sucked through the by-pass channel 18, which ensures better circulation of the air in the suction channel 5, so that dust particles that levitate inside the suction channel 5 are sucked into the device 4 for collecting the dust.

The vacuum cleaner 1 also has a control unit 8 configured to control the suction unit 3, with a processor 8' for storing, calculating and interpreting signals or data. The control unit 8 is operated by the user by activating a starting and stopping device 9 which electrically communicates with the control unit 8 and is configured to generate a cleaning start signal or a cleaning end signal SE.

Further, the intake device 7 is also adapted to generate the cleaning end signal SE, which initiates the method of cleaning the suction channel 5. Therefore, the user can choose how to start the process of cleaning the suction channel 5. The intake device 7 is bi-directionally electrically connected to the control unit 8, in order to transmit data or signals between the intake device 7 and the control unit 8. At the moment when the user decides to finish cleaning the surface 13, he or she changes the state of the starting and stopping device 9 or alternatively changes the state of the intake device 7. In the first case, in the event of detecting the cleaning end signal SE, the control unit 8 generates a signal S1 to change the state of the intake device 7 from the closed to the opened by using an actuator 10, and starts counting time to switch off the supply to the suction unit 3, or alternatively the suction unit 3 is switched off immediately, and dust particles are sucked into the device 4 for collecting the dust. If the user decides to use the intake device to start the cleaning method of the suction channel 5, he or she changes the state thereof from the closed to the opened state, then the intake device 7 generates the cleaning end signal SE for the control unit 8 which starts calculating time to switch off the supply of the suction unit 3, or alternatively the suction unit 3 is switched off immediately, and dust particles are sucked into the device 4 for collecting the dust, by the momentum of the suction unit 3. The control unit 8 informs the user about the end of the cleaning process of the suction channel 5, and the intake device 7 is operated to enter the closed state, manually by the user or automatically by the control unit 8 which generates and sends a signal S2 to the intake device 7 to be changed to the closed state by the actuator 10.

Figure 2:
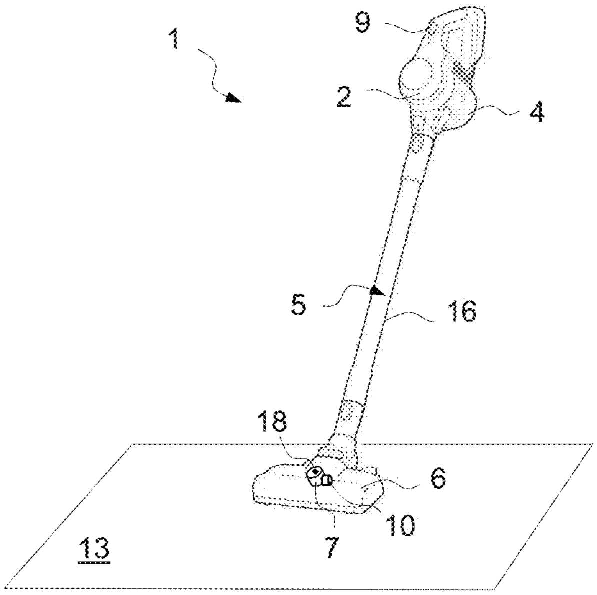
FIG. 2 is a perspective view of a vacuum cleaner with the preferred embodiment of the present invention.

FIG. 2 shows a preferred embodiment of the vacuum cleaner 1. The vacuum cleaner 1, which is intended for cleaning a surface 13, has a body 2 with an electrically-driven suction unit 3 (not shown), a device 4 for collecting the dust, and a nozzle 6 for cleaning the surface 13, that is fluidically connected with the body 2 through a suction pipe 16 and is formed together the suction channel 5. The nozzle 6 has an inlet 17 (not shown) disposed on the bottom side thereof and an intake device 7 that is disposed on the upper portion of the nozzle 6. The intake device 7 is a valve with an actuator 10 for opening and closing it. The valve has a by-pass channel 18 which is fluidically communicated with the suction channel 5 and provided for ensuring feeding of an additional portion of air into the suction channel in order to bypass the inlet 17. The vacuum cleaner 1 also includes a control unit 8 (not shown) and a starting and stopping device 9, which is in the form of an on/off electrical switch connected to the control unit 8 by wires. The control unit 8 has a processor 8' for storing, calculating and interpreting signals or data and is configured to control the suction unit 3 and the intake device 7. While cleaning the surface 13, the switch is on and the valve is closed, therefore air is sucked into the suction channel 5 only through the inlet 17. If the user decides to finish this process he or she changes the state of the switch from on to off, the switch state change is transmitted to the control unit 8 which changes the state of the valve to open the by-pass channel 18 and starts calculating time to switch off the supply of the suction unit 3, or alternatively the suction unit 3 is switched off immediately, and dust particles are sucked from the suction channel into the device 4 for collecting the dust. The control unit 8 informs the user about the end of the cleaning process of the suction channel 5, and the control unit 8 generates and sends a signal S2 to the actuator 10 to close the valve.

Figure 3:
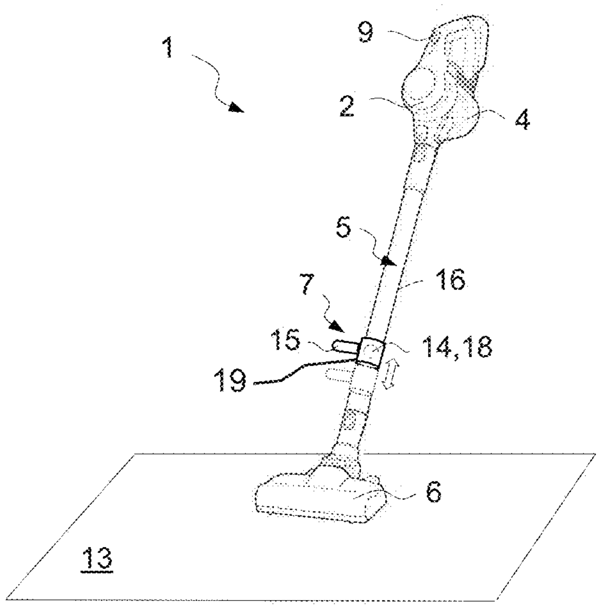
FIG. 3 is a perspective view of a vacuum cleaner according to another preferred embodiment of the invention.

FIG. 3 shows another preferred embodiment of the vacuum cleaner 1. The vacuum cleaner 1, which is intended for cleaning a surface 13, has a body 2 with an electrically-driven suction unit 3 (not shown), a device 4 for collecting the dust, and a nozzle 6 for cleaning the surface 13, that is fluidically connected with the body 2 through a suction pipe 16 which is formed together the suction channel 5. The nozzle 6 has an inlet 17 (not shown) disposed on the bottom side thereof. The vacuum cleaner 1 also includes an intake device 7 which is disposed on the suction pipe 16. The intake device 7 has a sleeve 19 which slides on the outer surface of the suction pipe 16 and an opening 14 is disposed in the suction pipe 16. The sleeve 19 is configured to air-tightly close or open the opening 14, when sliding along the suction pipe 16. The sleeve 19 is provided with a handle 15 which projects from an outer surface of the sleeve 19 transversely to the movement of the sleeve 19. The vacuum cleaner 1 also includes a control unit 8 (not shown) and a starting and stopping device 9 which is in the form of an on/off electrical switch connected to the control unit 8 by wires. The control unit 8 has a processor 8' for storing, calculating and interpreting signals or data and is configured to control the suction unit 3 and the intake device 7. While cleaning the surface 13, the switch is on and the opening 14 is covered by the sleeve 19, therefore air is sucked only through the inlet 17 into the suction channel 5. If the user decides to finish cleaning the surface 13, he or she presses the handle 15 of the sleeve 19, and in this way the sleeve 19 slides along the suction pipe 16 and the opening 14 is no longer covered by the sleeve 19. At this moment the intake device 7 sends the signal SE to the control unit 8, which starts calculating time to switch off the suction unit 3 from the supply, or alternatively the suction unit 3 is switched off immediately, and dust particles are sucked from the suction channel into the device 4 for collecting the dust, with the help of the additional portion of air sucked through the opening 14. The control unit 8 informs the user about the end of the cleaning process of the suction channel 5. Then, the user moves the sleeve 19 back to cover the opening 14.

Figure 4:
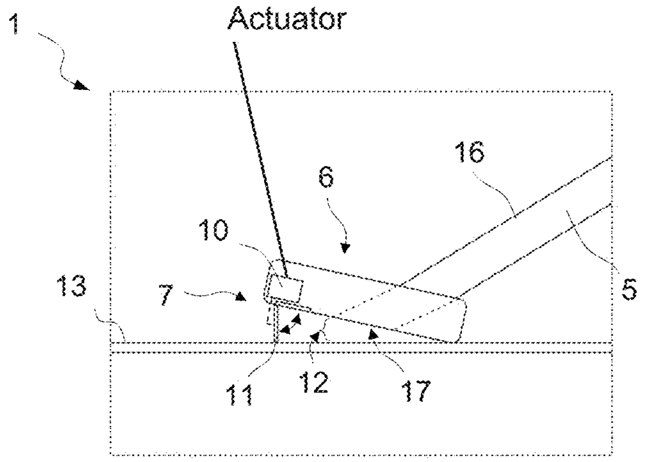
FIG. 4 is a fragmentary, side-elevational view of a vacuum cleaner according to another preferred embodiment of the invention.

FIG. 4 shows another preferred embodiment of a vacuum cleaner 1 in a fragmentary view. The vacuum cleaner 1 for cleaning a surface 13 has a body 2 (not shown) with an electrically-driven suction unit 3 (not shown), a device 4 for collecting the dust (not shown), and a nozzle 6 for cleaning the surface 13, that is fluidically connected with the body 2 through a suction pipe 16 and is formed together with the suction channel 5. The nozzle 6 has an inlet 17 disposed on the bottom side thereof. The vacuum cleaner 1 also includes an intake device 7 that is disposed at the bottom side of the nozzle 6. The intake device 7 includes at least one paddle 11, that is pivotally disposed on the bottom of the nozzle 6. The actuator 10 is configured to rotate the paddle 11 between horizontal and vertical positions about a pivot axis lying on the bottom of the nozzle 6, in order to increase a gap 12 between the bottom of the nozzle 6 and the cleaned surface 13, when the intake device 7 is in the opened state. Further, the vacuum cleaner 1 has a control unit 8 (not shown) and a starting and stopping device 9 which is in the form of an on/off electrical switch connected to the control unit 8 by wires. The control unit 8 has a processor 8' for storing, calculating and interpreting signals or data and is configured to control the suction unit 3 and the intake device 7. While cleaning the surface 13, the switch is on and the paddle 11 stays horizontally relative to the surface 13 and is hidden in the bottom of the nozzle 6. Therefore, air is sucked into the suction channel only through the very small gap 12 into the inlet 17. If the user decides to finish the process of cleaning the surface 13, he or she changes the state of the switch from on to off, the change of the state of the switch is transmitted to the control unit 8, and then the control unit 8 sends the signal S1 to the intake device 7 to move the paddle 11 from the horizontal to the vertical position. The actuator 10 rotates the paddle 11, and therefore the gap 12 is increased, which allows more air to be drawn into the suction channel 5. At the same moment the control unit 8 starts calculating time to switch off the suction unit 3 from the supply, or alternatively the suction unit 3 is switch off immediately, and dust particles are sucked from the suction channel into the device 4 for collecting the dust by the momentum of the suction unit 3. The control unit 8 informs the user about the end of the cleaning process of the suction channel 5, and the control unit 8 generates and sends a signal S2 to the actuator 10 which rotates the paddle 11 back to its initial horizontal position.

Although the invention has been explained in relation to its preferred embodiments as mentioned above, it is to be understood that many other possible modifications and variations can be made without departing from the scope of the present invention. It is, therefore, contemplated that the appended claim or claims will cover such modifications and variations that fall within the true scope of the invention.

The following is a summary list of reference numerals and the corresponding structure used in the above description of the invention.

LIST OF REFERENCE SIGNS

1 vacuum cleaner
2 body
3 suction unit
4 device for collecting the dust
5 suction channel
6 nozzle
7 intake device
8 control unit
8' processor
9 starting and stopping device
10 actuator
11 paddle
12 gap
13 cleaned surface
14 opening
15 handle
16 suction pipe
17 nozzle inlet
18 bypass channel
19 sleeve
SE cleaning end signal
S1 signal 1
S2 signal 2
D1 data

The invention claimed is:

1. A vacuum cleaner for cleaning a surface, the vacuum cleaner comprising:
a body;
an electrically-driven suction unit;
a device for collecting dust;
a suction channel;
a nozzle fluidically communicating with said body through said suction channel;
an intake device having a by-pass channel, said intake device fluidically communicating with said suction unit, being configured for ensuring feeding of an additional portion of air into said suction channel, and configured to be adjusted between an opened state and a closed state for opening and closing said by-pass channel;
a control unit configured to control said suction unit, said control unit having a processor for storing, calculating and interpreting signals or data;
a starting and stopping device being operated by a user, electrically communicating with said control unit and configured to generate a cleaning start signal or a cleaning end signal;
said intake device being bi-directionally electrically connected to said control unit for enabling transmission of data or signals between said intake device and said control unit;
said control unit being configured to generate a signal for controlling said intake device upon detecting the cleaning start signal or the cleaning end signal;
said starting and stopping device being configured to detect a cleaning end signal generated by a user's change of state of said starting and stopping device from an on position to an off position;
said control unit detecting said cleaning end signal and, in response to said cleaning end signal, said control unit generating a signal to change said intake device from said closed state to said opened state, thereby opening said by-pass channel to allow the additional portion of air to be drawn into said suction channel; and
said control unit being configured to subsequently control said suction unit to continue operation for a predetermined time to remove dust particles from said suction channel before switching off said suction unit.

2. The vacuum cleaner according to claim 1, wherein said intake device is configured to generate data providing said control unit with information about the state of said intake device, the data enabling said control unit to control said suction unit.

3. The vacuum cleaner according to claim 1, wherein said intake device has an actuator controlled by said control unit, said actuator configured to change the state of said intake device based on the signal generated by said control unit.

4. The vacuum cleaner according to claim 3, wherein said starting and stopping device is an electrical switch communicating with said control unit over a wired transmission.

5. The vacuum cleaner according to claim 1, wherein said intake device includes at least one paddle disposed on a bottom of said nozzle, said actuator being configured to rotate said paddle between horizontal and vertical positions relative to said bottom of said nozzle to increase a gap between said bottom of said nozzle and the surface when said intake device is in the opened state.

6. The vacuum cleaner according to claim 1, wherein said intake device includes a solenoid valve configured to be operated by said control unit, said solenoid valve being disposed in said nozzle, fluidically connected with said suction channel and configured to allow inlet air to bypass a nozzle inlet of said nozzle.

7. A method for operating a vacuum cleaner, the method comprising:

providing the vacuum cleaner according to claim 1; and cleaning the suction channel by performing the following steps:

operating said suction unit and placing said intake device in the closed state before starting a process of cleaning said suction channel;

starting the process of cleaning said suction channel upon changing the state of said starting and stopping device from an on to an off position and sending the cleaning end signal to said control unit;

switching said suction unit off immediately or alternatively after expiration of the counted time period;

using said control unit to generate the signal and send the signal to said intake device;

based on the signal generated by said control unit, changing said intake device from the closed state to the opened state;

using said control unit to switch off said suction unit after a predetermined time calculated by the processor;

ending the process of cleaning said suction channel;

informing the user about the end of the process of cleaning said suction channel; and changing said intake device to the closed state manually by operation of the user or automatically by said control unit generating and sending a signal to said intake device configured to be actuated.

* * * * *